(12) United States Patent
Arambepola et al.

(10) Patent No.: US 8,611,407 B2
(45) Date of Patent: Dec. 17, 2013

(54) PHASE DETECTION IN DIGITAL COMMUNICATION RECEIVERS

(75) Inventors: Bernard Arambepola, Middlesex (GB); Thushara Hewavithana, Borehamwood (GB); Sahan S. Gamage, Cambridge (GB); Parveen K. Shukla, Nottingham (GB)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 13/286,326

(22) Filed: Nov. 1, 2011

(65) Prior Publication Data

US 2013/0107992 A1 May 2, 2013

(51) Int. Cl.
*H04B 3/46* (2006.01)

(52) U.S. Cl.
USPC ............................................. 375/226; 375/375

(58) Field of Classification Search
USPC .......... 375/226, 326, 327, 340, 371, 375–376
See application file for complete search history.

(56) References Cited

U.S. PATENT DOCUMENTS

| | | | | |
|---|---|---|---|---|
| 5,406,587 A * | 4/1995 | Horwitz et al. | ............... | 375/346 |
| 5,572,551 A * | 11/1996 | Kearney et al. | ............... | 375/326 |
| 5,764,102 A * | 6/1998 | Cochran et al. | ............... | 329/304 |
| 5,768,323 A * | 6/1998 | Kroeger et al. | ............... | 375/355 |
| 5,796,786 A * | 8/1998 | Lee | ............... | 375/326 |
| 5,872,815 A * | 2/1999 | Strolle et al. | ............... | 375/321 |
| 6,151,367 A * | 11/2000 | Lim | ............... | 375/326 |
| 6,298,100 B1 * | 10/2001 | Bouillet | ............... | 375/326 |
| 6,445,752 B1 * | 9/2002 | Jiang et al. | ............... | 375/326 |
| 6,665,355 B1 * | 12/2003 | Chen et al. | ............... | 375/321 |
| 6,707,861 B1 * | 3/2004 | Stewart | ............... | 375/321 |
| 7,352,831 B2 * | 4/2008 | Quinlan et al. | ............... | 375/344 |
| 2004/0114701 A1 * | 6/2004 | Markman | ............... | 375/371 |
| 2006/0133527 A1 * | 6/2006 | Yu et al. | ............... | 375/346 |
| 2007/0253497 A1 * | 11/2007 | Chen | ............... | 375/260 |
| 2007/0274416 A1 * | 11/2007 | Ishii | ............... | 375/321 |
| 2008/0089443 A1 * | 4/2008 | Sanada et al. | ............... | 375/319 |

* cited by examiner

*Primary Examiner* — Emmanuel Bayard
(74) *Attorney, Agent, or Firm* — Pillsbury Winthrop Shaw Pittman LLP (57) ABSTRACT

According to various embodiments, apparatus and methods disclosed herein include computing phase error of a received signal based on an estimate of a first component (e.g., in-phase component) of a transmitted signal and an analytic representation of the estimate of the first component of the transmitted signal. The analytic representation of the estimate of the first component of the transmitted signal may represent an estimate of a second component (e.g., quadrature phase component) of the transmitted signal. The analytic representation of the estimated first component may be computed using at least one of a Hilbert transform or Fourier transform on the estimated first component of the transmitted signal.

20 Claims, 5 Drawing Sheets

Figure 5

PHASE DETECTION IN DIGITAL COMMUNICATION RECEIVERS

FIELD

This disclosure relates generally to digital wired or wireless communication, and more particularly to phase detection or phase tracking in digital receivers, e.g., digital television receivers.

BACKGROUND

The advanced television systems committee (ATSC) standard used for terrestrial digital television (DTV) is based on single-carrier VSB modulation. ATSC mobile/handheld (ATSC MIH) standard is a mobile/handheld variant of the ATSC standard. A typical DTV receiver performs, among other functions, phase detection on the received DTV signal. In the absence of any additive noise at the input to a DTV receiver, a phase detector to determine an accurate estimate of the phase error in the received signal may be implemented based on the following equation:

$$\text{Phase\_Error} = \frac{I - \text{Decision}(I)}{Q}$$

However, in practical scenarios where noise is present in the received signal, phase detectors based on the above equation may not be able to provide an accurate estimate of the phase error. As such, an inaccurate phase detection resulting from inaccurate phase error value generation may be result in erroneous demodulation and regeneration of DTV signal.

Accordingly, it is desirable to develop and provide a phase detection technique for digital receivers that may be used to accurately estimate phase error in the presence of noise in the received signals.

DETAILED DESCRIPTION

In the description that follows, like components have been given the same reference numerals, regardless of whether they are shown in different aspects. To illustrate one or more aspect(s) of the present disclosure in a clear and concise manner, the drawings may not necessarily be to scale and certain features may be shown in somewhat schematic form. Features that are described and/or illustrated with respect to one aspect may be used in the same way or in a similar way in one or more other aspects and/or in combination with or instead of the features of the other aspects of the technology disclosed herein.

SUMMARY

In broad overview, apparatus and methods in accordance with various embodiments of the present disclosure may be implemented in connection with digital wired or wireless receivers, e.g., digital television (DTV) receivers, including, but not limited to, receivers based on advanced television systems committee (ATSC) standard, or ATSC mobile/handheld (ATSC M/H) standard. In some embodiments, digital receivers are configured to equalize and demodulate signals that are modulated (e.g., at a transmitter) using at least one of a plurality of single-carrier modulation schemes, including, but not limited to, vestigial sideband (VSB) modulation schemes.

In accordance with various embodiments of the present disclosure, an apparatus including a phase detector is disclosed. The phase detector may be configured to compute phase error of a signal received at a digital receiver, e.g., based on an estimate of a first component (e.g., in-phase component) of a transmitted signal (corresponding to the received signal), and an analytic representation of the estimate of the first component of the transmitted signal. The analytic representation of the estimated first component of the transmitted signal may represent an estimate of a second component (e.g., quadrature phase component) of the transmitted signal. In some embodiments, the received signal includes a modulated signal, which is modulated (e.g., at a transmitter) using a single-carrier modulation scheme, e.g., a vestigial sideband modulation scheme.

In some embodiments, the apparatus further includes an estimate module configured to compute the estimate of the first component of the transmitted signal based on a first component of the received signal. For example, the estimate module may be configured to compute the estimate of the first component of the transmitted signal by quantizing the first component of the received signal.

In some embodiments, the apparatus further includes a transform module configured to perform at least one of a Hilbert transform or a Fourier transform on the estimate of the transmitted signal's first component to compute the analytic representation of the estimated first component. The transform module may include a digital filter configured to compute an approximate Hilbert transform of the first component of the transmitted signal.

In some embodiments, the apparatus further includes a delay module to compute a delayed version of the received signal, and a delayed version of the estimate of the first component of the transmitted signal. As such, the phase detector may be configured to compute the phase error further based on the delayed version of the received signal, and the delayed version of the estimate of the first component of the transmitted signal.

In accordance with various embodiments of the present disclosure, a method is disclosed that includes computing, e.g., using a processor, phase error of a signal received at a digital receiver based on an estimate of a first component (e.g., in-phase component) of a transmitted signal (corresponding to the received signal), and an analytic representation of the estimate of the first component of the transmitted signal. The analytic representation of the estimated first component of the transmitted signal may represent an estimate of a second component (e.g., quadrature phase component) of the transmitted signal. In some embodiments, the received signal includes a modulated signal, which is modulated (e.g., at a transmitter) using a single-carrier modulation scheme, e.g., a vestigial sideband modulation scheme.

In some embodiments, the method further includes computing the estimate of the first component of the transmitted signal based on a first component of the received signal. For example, to compute the estimate of the first component of the transmitted signal, the first component of the received signal may be quantized, e.g., based on a set of discrete pre-determined values.

In some embodiments, the method further includes performing at least one of a Hilbert transform or a Fourier transform on the estimate of the transmitted signal's first component to compute the analytic representation of the estimated first component. A digital filter configured to compute an approximate Hilbert transform may be used to obtain the analytic representation of the estimated first component.

In some embodiments, the method further includes computing or obtaining a delayed version of the received signal, and a delayed version of the estimate of the first component of the transmitted signal. Accordingly, computing the phase error may further be based on the delayed version of the received signal, and the delayed version of the estimated first component of the transmitted signal.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a," "an," and "the" include plural referents unless the context clearly dictates otherwise.

DESCRIPTION

Figure 1:
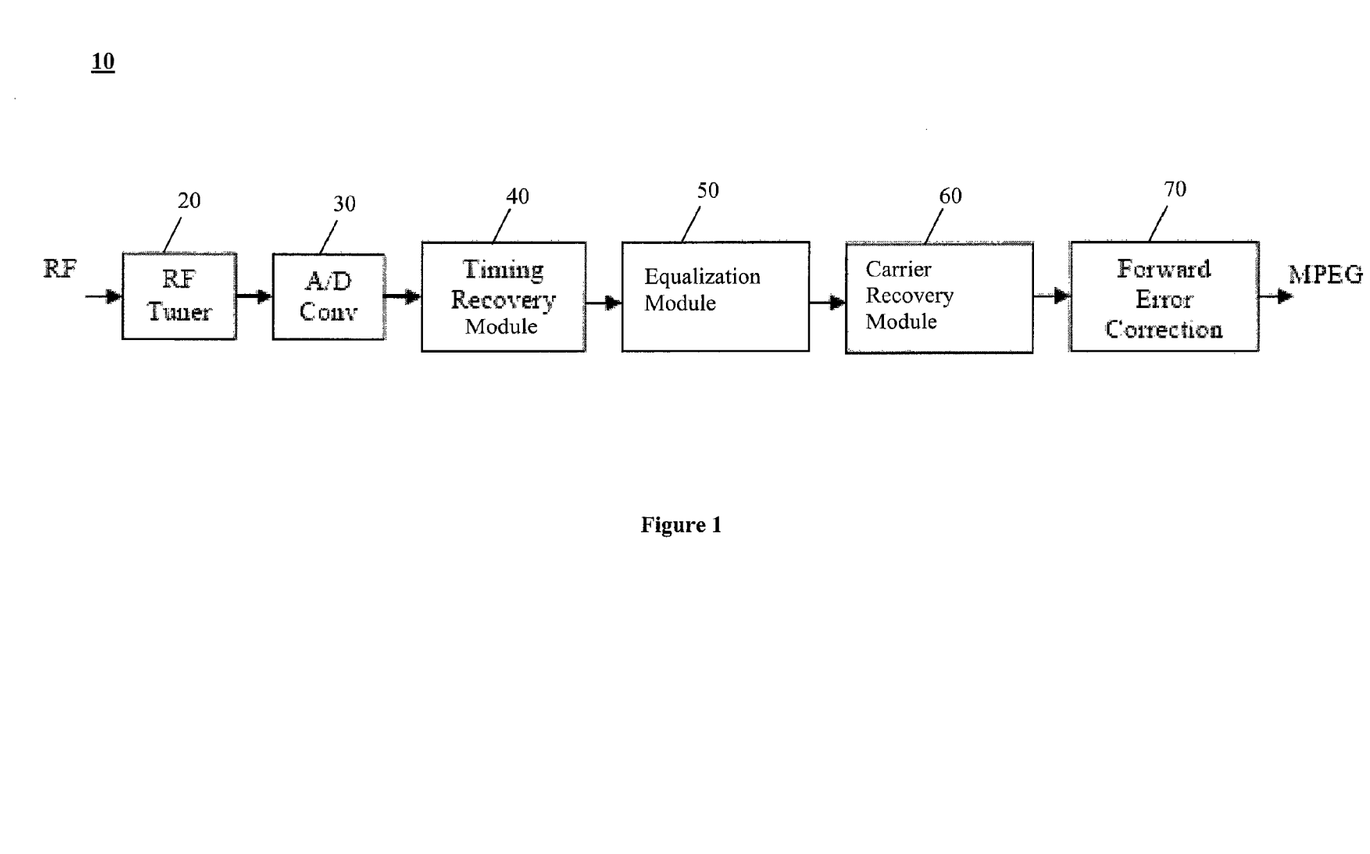
FIG. 1 is a block diagram of an exemplary digital television receiver.

FIG. 1 depicts a typical digital television (DTV) receiver 10 implemented, e.g., based on one of a plurality of DTV standards including, but not limited to, ATSC standard, or ATSC M/H standard. DTV receiver 10 may be part of a DTV system that also includes a DTV transmitter (not shown). As such, the DTV transmitter (and other components of the DTv system) may be implemented based on the same DTV standard as of DTV receiver 10. In some implementations, the DTV transmitter may be configured to modulate audio, video and/or other data signals using at least one of a plurality of single-carrier modulation schemes including, but not limited to, VSB modulation schemes. Similarly, DTV receiver 10, which may be static or mobile, may be configured to demodulate modulated radio-frequency (RF) signals received from the DTV transmitter based on the demodulation scheme corresponding to the modulation scheme used at the transmitter. In some embodiments, receiver 10 includes, or may be implemented within a user-operated device. Examples of such a user-operated device may include, but not limited to, a cellular phone operational with the DTV system as well as with a cellular phone network (not shown), a laptop, a smartphone, and other mobile and/or handheld devices capable of receiving, processing and/or rendering multimedia information.

As shown, DTV receiver 10 may include an RF tuner 20, an analog-to-digital (A/D) converter 30, a timing recovery module 40, an equalization module 50, a carrier recovery module 60, and a forward error correction (FEC) module 70. In some embodiments, RF tuner 20 is configured to receive the RF signal transmitted by the DTV transmitter by tuning or setting to the appropriate frequency (or a range of frequencies) at which the RF signal was transmitted, and produce analog signals for further processing at receiver 10. RF Tuner 20 may be configured to translate the frequency of a chosen channel to a common Intermediate Frequency (IF), or to Zero Intermediate Frequency (ZIF). For example, an ATSC TV signal with the bandwidth of around 6 MHz may be transmitted at around 600 MHz. As such, the transmission spectrum may extend from 597 MHz to 603 MHz. The IF frequency used for ATSC standard in RF tuners is typically around 43.75 MHz. Accordingly, RF tuner 20 may be configured to translate this to the frequency range 40.75 MHz to 46.75 MHz. The IF frequency of about 43.75 MHz is typically chosen so that low-cost Surface Acoustic Wave (SAW) filters used to isolate the wanted channel that are typically designed for this frequency may be used in the RF receiver. However, other values for the IF frequency may be used, e.g., lower IF frequencies such as 4 MHz. In that, the ATSC TV signal may be transmitted in the frequency range of about 1 to 7 MHz. In some embodiments, zero-IF tuners may be used that are configured to bring the transmitted signal down to "true" baseband. For example, using a zero-IF tuner, the TV channel is centered at 0 MHz, with the channel extending from −3 MHz to +3 MHz. RF tuner 20 may be further configured to filter out any unwanted channels to keep only the desired channel.

A/D converter (ADC) 30 may be configured to receiver the analog signals produced by RF tuner 20 and convert them into discrete-time digital signals (e.g., in binary form) for further processing in receiver 10. A/D converter 30 may be implemented as a direct-conversion ADC, a successive-approximation ADC, a ramp-compare ADC, a Wilkinson ADC, an integrating ADC, a delta-encoded ADC, a sigma-delta ADC, a time-interleaved ADC, or combination thereof, or based on other known techniques.

In some embodiments, timing recovery module 40 is configured to recover or generate the same clock (or "timing") for the received digitized signal as that used during transmission by the transmitter to accurately recover transmission data at receiver 10. For example, timing recovery module 40 may be configured to digitally interpolate the received signal to get a new sampled signal with correct sampling frequency and sampling phase. In some embodiments, timing recovery module 40 may be implemented as, or include, a timing phase locked loop that includes a timing error detector, a low pass filter (LPF), and a numerically-controlled oscillator (NCO). The timing error detector may be configured to detect and output timing error information using the output of a multiplier that re-samples (i.e., digitally interpolates) the sampled signal from the ADC 30 based on a signal from the NCO. The LPF may be configured to only pass through low-band signal components from the timing error information generated by the timing error detector.

In some embodiments, equalization module 50 is configured to mitigate or eliminate inter-symbol interference (ISI) caused due to multi-path profile of the transmission channel, and/or other interferences and noises in the received signal, and provide the equalized signal to facilitate accurate recovery of the transmitted signal. For example, in the DTV system, a bit detection error may be caused at receiver 10 due to distortion generated as the transmission signal passes through the multi-path channel, interference caused by other signals (e.g., NTSC signals), distortion by a transceiver system, and/or other interferences and distortions. Particularly, the propagation of a signal through the multi-path causes inter-symbol interference to cause a bit detection error. Accordingly, equalization module 50 may be configured to remove the ISI and/or other interferences and noises in the channel. Equalization module 50 may be configured to perform equalization in the time domain or the frequency domain, and may be implemented in accordance with one of a plurality of DTV standards and/or based on other digital receiver designs well-known to a person of ordinary skill in the art.

Figure 2:
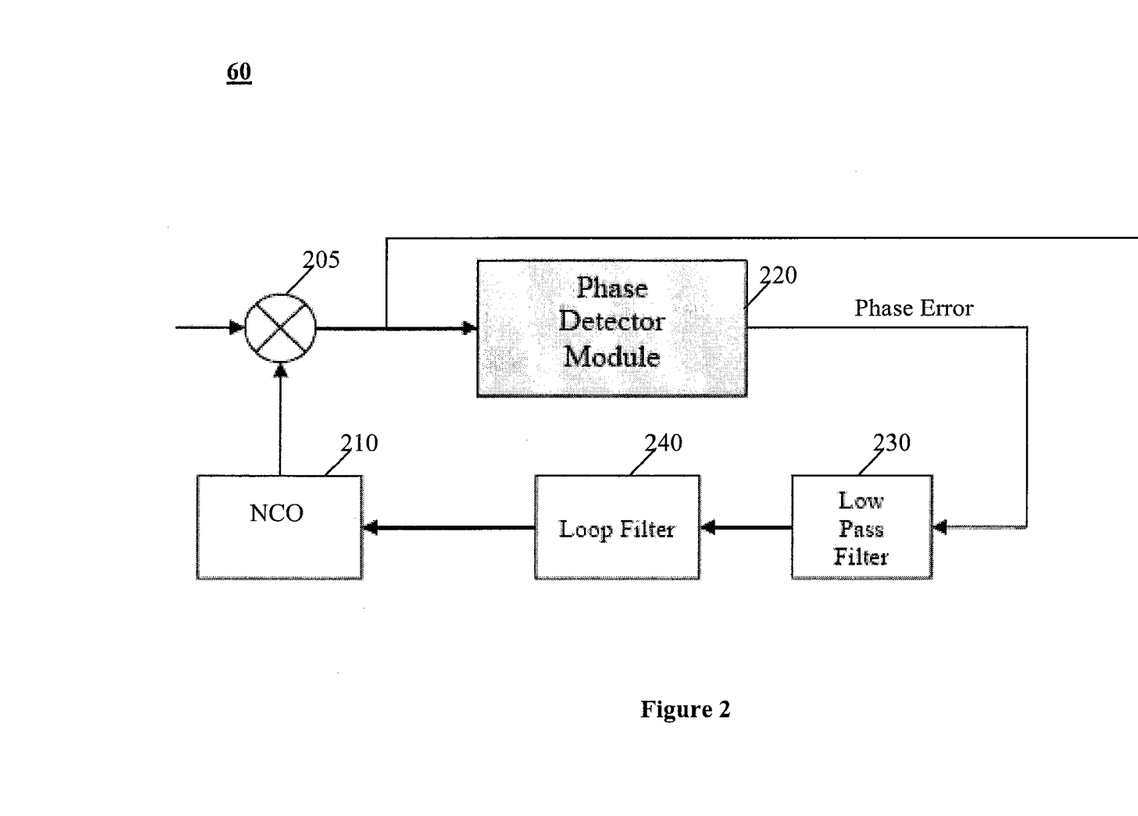
FIG. 2 is a block diagram of an exemplary carrier recovery module of the receiver depicted in FIG. 1.
Figure 3:
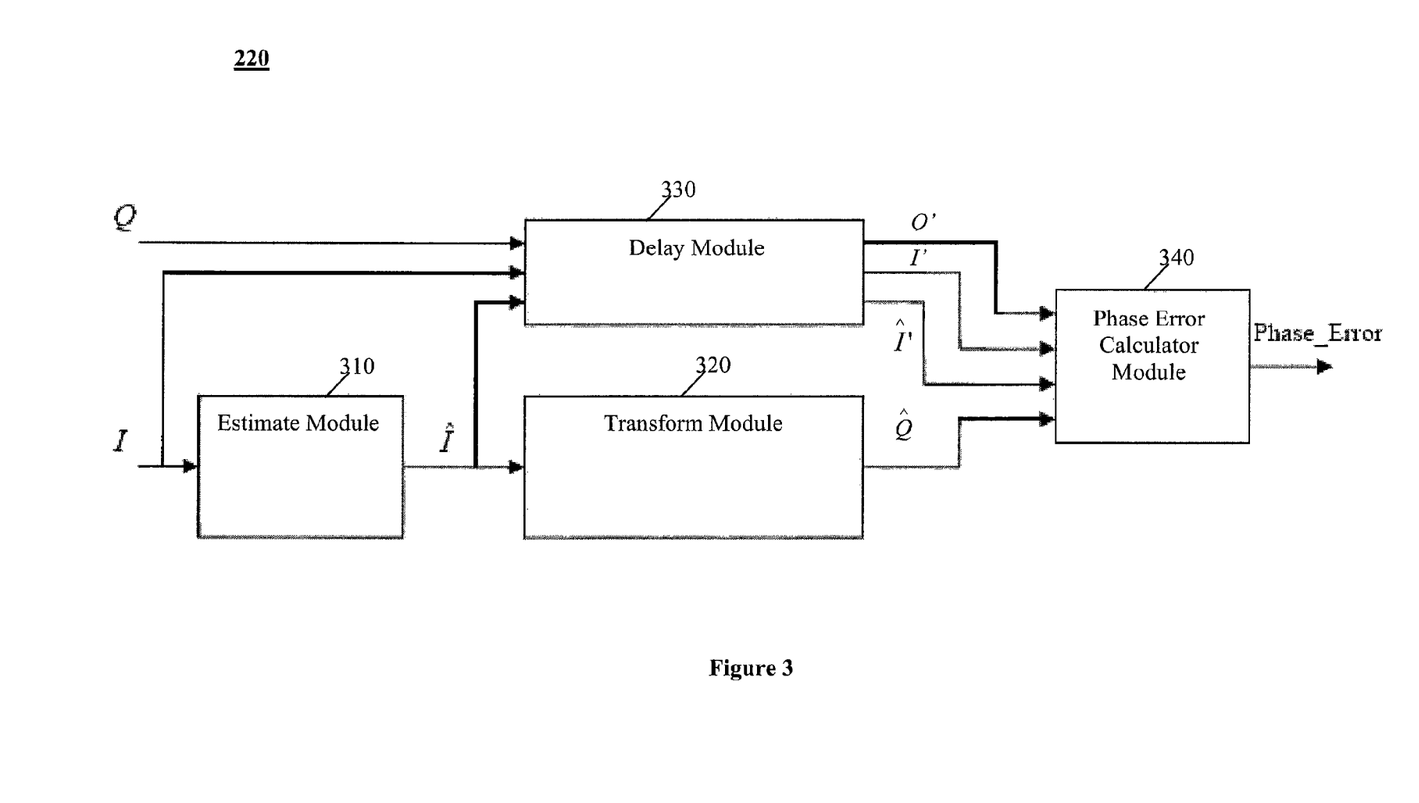
FIG. 3 is a block diagram of an exemplary phase detector module of the carrier recovery module depicted in FIG. 2.

Further, in the DTV system, frequency offset corresponding to, e.g., several hundreds of KHz, and phase error may be generated by a tuner or an RF oscillator during DTV signal reception. As such, the frequency offset and phase error may be required to be corrected in the equalized signal for exact data recovery at receiver 10. Accordingly, acquisition and tracking may be performed to minimize the frequency offset and phase error, and such acquisition and tracking process is called carrier recovery. In some implementations, the carrier recovery is implemented in carrier recovery module 60, e.g., as illustrated in FIGS. 2 and 3, and described in detail below. In some implementations, FEC module 70 is configured to demap equalized signal with noisy constellation points into corresponding bits, which are then decoded based on the forward error correction (FEC) scheme used in the transmitted signal to correct for any bit errors.

FIG. 2 illustrates an exemplary implementation of carrier recovery module 60 in accordance with various embodiments disclosed herein. Carrier recovery module 60 may be implemented as a phase-locked loop (PLL), and as shown, may include a complex multiplier (i.e., phase rotator) 205, an NCO 210, a phase detector module 220, a low-pass filter 230, and a loop filter 240. In operation, for example, phase detector module 220 is configured to estimate phase error, e.g., from the signal provided by multiplier 205, and output the estimated phase error to low-pass filter 230 and loop filter 240. In some embodiments, loop filter 240 is configured to filter and integrate the low-pass filtered output of phase detector module 220, and output a final value to NCO 210. NCO 210 may be configured to generate a complex sinusoidal wave relative to the output of loop filter 240, and output the complex sinusoidal or complex exponential wave to multiplier 205.

In some embodiments, carrier recovery module 60 may be further configured to detect and track out frequency offset from the received signal. For example, in the case when the frequency offset is small compared to the symbol rate of the signal, carrier recovery module 60 may be configured to track out the frequency offset during the acquisition period. In some embodiments, loop filter 240 includes a proportional and an integral path (P+I) filter. The frequency offset gets accumulated in the integrator of the P+I filter, and therefore in the tracking phase, module 60 may only track phase and small frequency drifts (e.g., frequency drifts caused by RF tuner 20, say due to temperature fluctuations).

In some embodiments, a phase divider (not shown) may be used in receiver 10 to divide the equalized received signal from equalization module 50 into in-phase component, I (or a first component) and quadrature component, Q (or a second component), and provide the two components of the signal to the input, e.g., at multiplier 205, of carrier recovery module 60. Multiplier 205 may be configured to receive a complex sinusoidal wave with a recovered carrier wave through NCO 210, and multiplies the complex sinusoidal wave with input signal components I and Q. The I and Q signal components output from multiplier 205 are output to phase detector module 220, which detects and outputs the phase error.

In general, the quality of the phase detection operation, e.g., performed by phase detector module 220 determines the ability of the demodulator to track out phase noise, which in turn determines the overall performance of receiver 10. In some embodiments, phase detection by module 220 is done without any knowledge of transmitted data, i.e., without any pilots or training sequences. As discussed above, the output of phase detector module 220 is associated with the phase error, e.g., the phase detector output is proportional to the phase error with a constant of proportionality, G. Additionally, the output of module 220 may also include a noise component, e.g., introduced by the process of phase detection. In some embodiments, for the phase error detector to be unbiased, this noise component has to be zero-mean. As such, the output of phase detector module 220 can be mathematically defined as:

$$PD\_Output = G*Phase\_Error + Phase\_Angle\_Noise, \quad (1)$$

wherein, the constant of proportionality, G is referred to as the gain of phase detector 220. Accordingly, it is clear from equation (1) that if the detector gain, G is high and the variance of the noise in the detected phase error is low, then the overall output performance of phase detector 220 is high, and vice-versa.

In some embodiments, the quality or performance of phase detector module 220 is expressed in terms of Signal-to-Noise ration (SNR) calculated based on the following equation:

$$PD\_SNR = \frac{G^2}{Phase\_Angle\_Noise\_Variance}, \quad (2)$$

wherein Phase_Angle_Noise_Variance represents the variance of the noise at the output of the phase error detector denoted by Phase_Angle_Noise in equation (1).

Typically, the phase error detected by a conventional phase detector is defined by the following equation:

$$Phase\_Error = \frac{I - Decision(I)}{Q}, \quad (3)$$

wherein I represents the in-phase or real component (or a first component) of the received signal, and Q represents the quadrature or imaginary component (or a second component) of the received signal. In some embodiments, e.g., based on the ATSC standard, the modulation scheme used in the DTV system including receiver 10 is based on VSB modulation, e.g., 8-VSB scheme. 8-VSB is an 8-level vestigial sideband modulation, in which a binary data stream is converted into an octal representation by amplitude modulating a sinusoidal carrier to one of eight levels. As such, in 8-VSB modulation, each symbol represents three data bits. Other modulation schemes, e.g., N-level variants of VSB modulation may be used. As such, the term "Decision (I)" in the equation (3) above represents the estimated value of I, i.e., the mapping of the value of I to the nearest of the N quantization levels for N-level VSB modulation scheme (e.g., eight levels for 8-VSB modulation).

However, a phase detector configured to operate in accordance with equation (3) may provide an accurate value of the phase error only under the assumption that there is no noise component (e.g., external noises, such as, but not limited to, Additive White Gaussian Noise (AWGN), or phase noise introduced by oscillators associated with RF tuner 20) at the input or output of the phase detector. Accordingly, to address the noise issues in the phase detector and thereby generate a relatively accurate measure of the phase error in the signal received by a phase detector, e.g., phase detector module 220, an exemplary embodiment of phase detector module 220 is illustrated in FIG. 3 and described in detail below.

As shown in FIG. 3, in some embodiments, phase detector module 220 includes a quantization or estimate module 310, a transform module 320, a latency or delay module 330, and a phase error calculator module 340. Estimate module 310 may be configured to receive the in-phase component I of the received signal (obtained at the output of multiplier 205), and quantize the I signal component into the nearest one of the N decision levels, e.g., based on the N-VSB (e.g., 8-VSB) modulation used in the signal. In FIG. 3, the output from the estimate module 310 is denoted by the symbol, $\hat{I}$.

The output signal $\hat{I}$ may represent an estimate of the in-phase component of a transmitted signal, and may be provided as the input to transform module 320. Transform module 320 may be configured to perform a transform on the signal $\hat{I}$ to generate an analytic representation thereof. In some embodiments, transform module 320 may be configured to perform Hilbert Transform on the signal $\hat{I}$ to generate the analytic representation thereof The Hilbert-transformed signal at the output of transform module 320 is denoted as $\hat{Q}$ that may represent an estimate of the quadrature component of the transmitted signal. The function performed by transform module 320 may be represented as:

$$\hat{Q}=H(\hat{I}) \quad (4)$$

Figure 4:
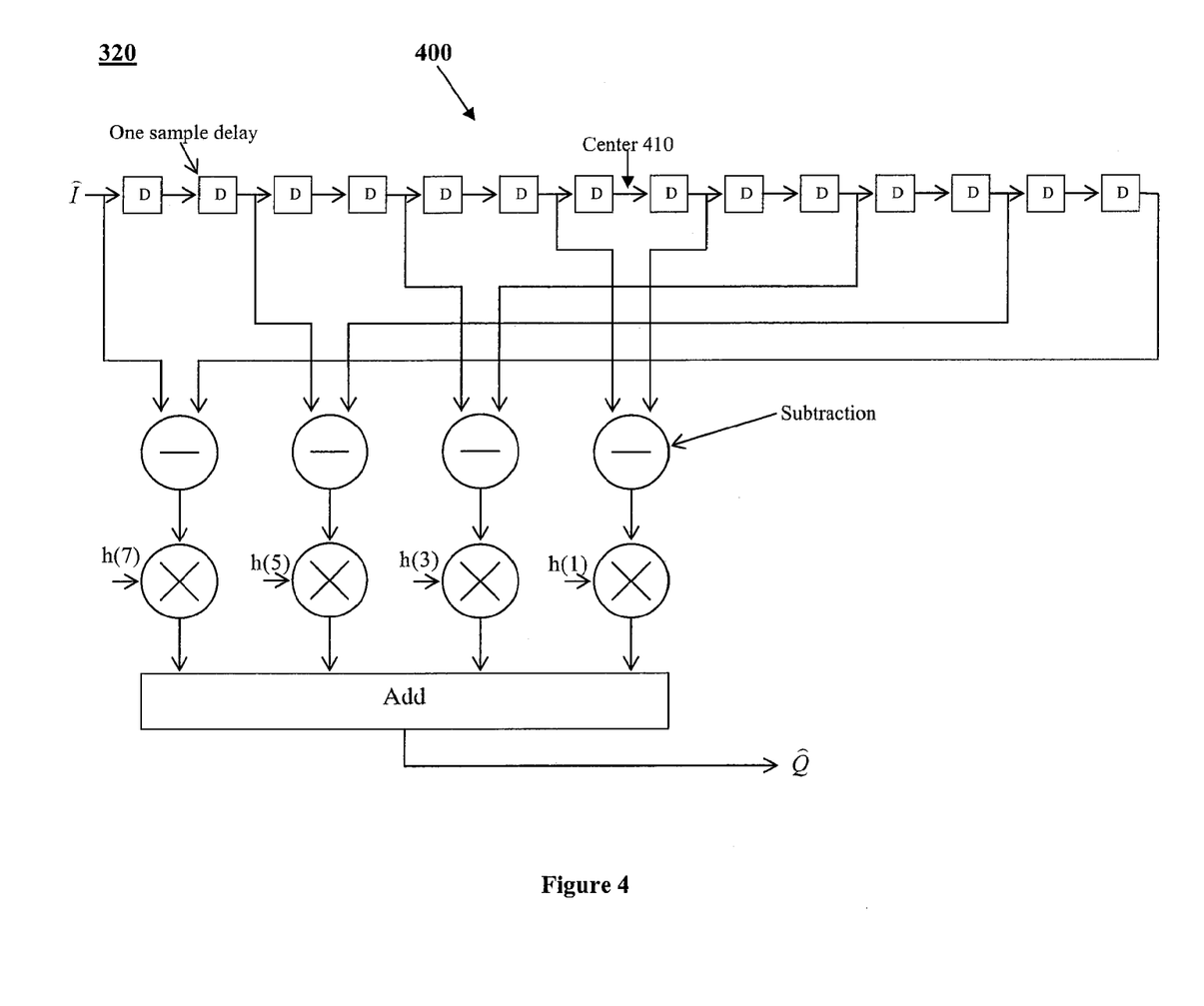
FIG. 4 illustrates an implementation of an exemplary transform module of the phase detector module depicted in FIG. 3.

In some embodiments, transform module 320 may include or be implemented as a digital filter to calculate an approximate Hilbert transform provided at its input, e.g., signal $\hat{I}$. The digital filter used to realize the approximate Hilbert transformation may depend on the roll-off of the root-raised-cosine pulse-shaping function used in the transmitter of the DTV system. The coefficients of such a digital filter may be anti-symmetric, and only the filter coefficients corresponding to odd indices may be non-zero. In some embodiments, such a filter is realized using eight non-zero coefficients to keep a reasonable implementation complexity. An exemplary non-limiting implementation of a digital filter 400 used to realize the approximate Hilbert transformation in transform module 320 is shown in FIG. 4. In this implementation, filter 400 is realized as a digital finite impulse response filter with 15 taps, and every other filter coefficient may be zero. In some embodiments, filter 400 is anti-symmetric about the centre of the delay line marked as center 410. If center 410 is defined as the filter tap zero, then anti-symmetric means that the filter coefficients satisfy the relationship, h(i)=−h(−i), where h(i) represents the value of the $i^{th}$ filter tap on one side (left or right) of center 410. Therefore, it may be possible to halve the number of multipliers, as shown in FIG. 4, by doing the subtraction before the multiplication. Other implementations of digital filter 400 may be used. Additionally, or alternatively, transform module 320 may be configured to calculate a Fourier transform on the signal $\hat{I}$ to generate the signal $\hat{Q}$.

In some embodiments, the transformation operation performed by transform module 320 may add delay or latency in the following operations (to be performed on $\hat{Q}$ and other signals) of phase detector module 220. Accordingly, in some embodiments, delay module 330 is configured to delay various signals, e.g., in-phase component I of the received signal, quadrature component Q of the received signal (e.g., both obtained at the output of multiplier 205), and the signal $\hat{I}$. The delayed signals at the output of delay module 330 are denoted as I', Q', and $\hat{I}$', respectively.

Further, signals I', Q', $\hat{I}$', and $\hat{Q}$ may be provided as inputs to phase error calculator module 340 for further processing to obtain the phase error value as the output of phase detector module 220. In some embodiments, module 340 is implemented to determine phase error based on the following operation:

$$\text{Phase\_Error} \propto I'(Q'-\hat{Q})-Q'(I'-\hat{I}') \quad (5)$$

In some implementations, as the filter length of the digital filter used to implement the approximate Hilbert transform length increases (ideally, tending to infinity), the detected phase error as calculated by equation (5) may asymptotically reach the exact phase error under no noise conditions as calculated by equation (3). However, under practical conditions including additive noise, phase noise and finite transform length, the proportionality of equation (5) is maintained with a constant of proportionality, e.g., detector gain G, which may be less than unity. The constant value G may reduce in value as the input noise to the receiver is increased.

Figure 5:
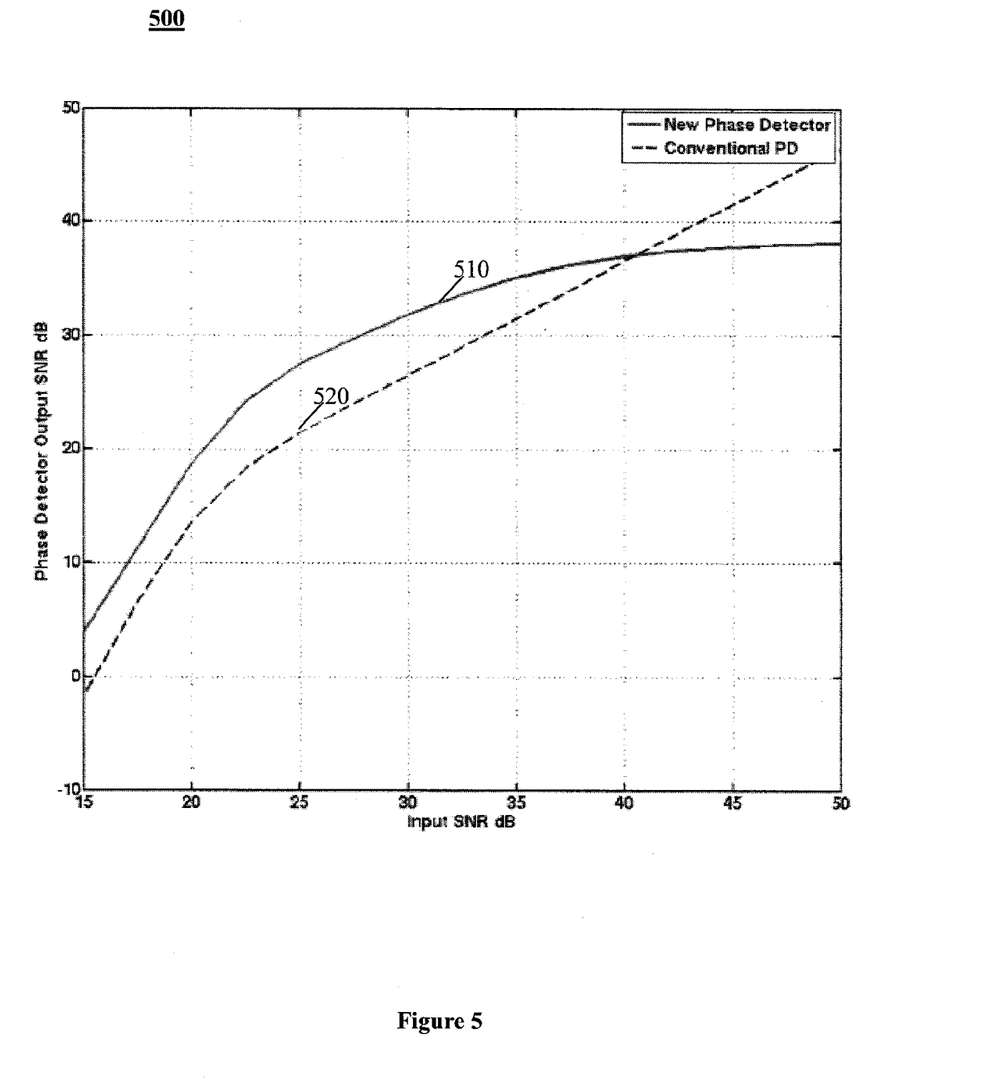
FIG. 5 illustrates a graphical representation of performance comparison of phase detectors.

FIG. 5 illustrates a graphical representation 500 of comparison of performance of phase detector module 220 (as illustrated in FIG. 3 and described above) with that of a phase detector functionally realized based on equation (3). To determine performance of an "equation (3)" detector, some modifications or constraints are considered on equation (3), e.g., not letting the denominator of equation (3) to become too small, so that the comparison can be done without introducing numerical instabilities. As shown in FIG. 5, the performance comparison is based on the SNR of the phase error detector defined by equation (2). Specifically, the SNR obtained at the output of the phase error detector (i.e., the "Y" axis in the graph of FIG. 5) is shown as a function of the SNR of the signal at the input to carrier recovery module 60 (i.e., the "X" axis in the graph of FIG. 5).

To compute SNR values (using equation (2)) of the phase error detectors based on equation (3), and equations (4) and (5), outputs (i.e., phase angle estimates) of each of the detectors are used to compute phase angle mean and phase angle variance values. For example, first, mean values of the phase detector outputs for a range of phase rotation angles, φ (e.g., from −5 degrees to +5 degrees) are computed. These measured mean phase angle estimates for each phase error detector are plotted against the actual phase φ, and the slope of that plot is used to compute the gain G of that phase error detector. Second, variance of the output of each phase error detector is computed. Given the computed gain G, and variance values, SNR value for each of the two phase error detectors is computed using equation (2).

Curve 510 in FIG. 5 corresponds to the SNR performance of phase detector 220 implemented based on equations (4) and (5), and curve 520 corresponds to the SNR performance of a phase detector implemented based on equation (3). As can be seen, for high SNR values (e.g., greater than 40 dB; corresponding to low or negligible noise component), the conventional method represented by curve 520 performs better than the phase detector 220 represented by curve 510. This may be attributed to the approximate nature of the detection algorithm involving equations (4) and (5). However, in more practical cases where the input SNR is in a low to moderate range (e.g., values less than 40 dB), phase detector 220 may provide significant performance gain over the conventional approach.

For clarity, resources and/or components of systems and apparatus shown in FIGS. 1, 2, 3 and 4 that not required or related to phase tracking or detection operations are not shown in those Figures, but such resources/components will be appreciated by a person of ordinary skill in the art. In one or more embodiments, one or more modules of receiver 10, carrier recovery module 60, phase detector module 220, and transform module 320 (illustrated in FIGS. 1, 2, 3, and 4, respectively), and/or other components/modules operatively associated therewith (not shown in figures) may include one or more processors and/or individual memory modules, to perform the functions and processes described above. Also, although the modules in FIGS. 1, 2, 3, and 4 are shown as individual components or elements, in one or more embodiments, those modules may be combined into one or more devices, one or more software programs, or one or more circuits on one or more chips. In some embodiments, one or more modules or components of receiver 10, module 60, module 220 and/or module 320 are part of a system which is located geographically remotely from the rest of the modules or components. In such a case, the remotely-located groups of modules may be operatively connected with each other through a wired or wireless network (not shown) using necessary interfaces and components. Such network may include one or more of a private TCP/IP network, the Internet, or a private or public radio frequency (RF) network.

In some embodiments, one or more modules of receiver 10, module 60, module 220 and/or module 320 are realized in one or more programmable devices such as a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Alternatively, or additionally, one or more modules of receiver 10, module 60, module 220 and/or module 320 may be implemented in software stored on an article of manufacture (e.g., floppy disks, CDs, hard disks, flash drives, etc.) to enable a general-purpose processor to perform the specific functions described herein, or combination of hardware and software. A machine-readable medium storing such software may include any mechanism for storing or transmitting information in a form readable by a machine (e.g., a computing device). For example, a machine-readable storage medium may include read only memory, random access memory, magnetic disk storage media, optical storage media, flash memory devices, and others.

As would be understood by a person with skill in the art, the functional block diagrams of FIGS. 1, 2, 3, and 4 are presented merely an aid in understanding the various functions of receiver 10, module 60, module 220 and module 320, respectively. Actual implementation of the desired functionality may be implemented by fewer or more functional modules. It must be understood that so long as the system performs all necessary functions, it is immaterial how they are distributed within the system and the programming or hardware architecture thereof.

In some embodiments, one or more storages or memories associated with one or more apparatus and modules described herein are of one or more of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described.

Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. An apparatus comprising:
a phase detector configured to compute phase error of a received signal based on an estimate of a first component of a transmitted signal and an analytic representation of the estimate of the first component of the transmitted signal, wherein the analytic representation of the estimate of the first component of the transmitted signal represents an estimate of a second component of the transmitted signal.

2. The apparatus of claim 1, further comprising an estimate module configured to compute the estimate of the first component of the transmitted signal based on a first component of the received signal.

3. The apparatus of claim 2, wherein the estimate module is configured to quantize the first component of the received signal to compute the estimate of the first component of the transmitted signal.

4. The apparatus of claim 1, further comprising a transform module configured to perform a Hilbert transform on the estimated first component of the transmitted signal to obtain the analytic representation thereof.

5. The apparatus of claim 4, wherein the transform module includes a digital filter configured to compute an approximate Hilbert transform on the estimated first component of the transmitted signal.

6. The apparatus of claim 1, further comprising a transform module configured to perform a Fourier transform on the estimated first component of the transmitted signal to obtain the analytic representation thereof.

7. The apparatus of claim 1, further comprising a delay module to compute a delayed version of the received signal, and a delayed version of the estimate of the first component of the transmitted signal,
wherein the phase detector is configured to compute the phase error further based on the delayed version of the received signal, and the delayed version of the estimate of the first component of the transmitted signal.

8. The apparatus of claim 1, wherein the received signal includes a modulated signal, wherein the modulated signal is modulated using a single-carrier modulation scheme.

9. The apparatus of claim 8, wherein the single-carrier modulation scheme includes a vestigial sideband modulation scheme.

10. A method comprising:
computing, using a processor, phase error of a received signal based on an estimate of a first component of a transmitted signal and an analytic representation of the estimate of the first component of the transmitted signal, wherein the analytic representation of the estimate of the first component of the transmitted signal represents an estimate of a second component of the transmitted signal.

11. The method of claim 10, further comprising computing the estimate of the first component of the transmitted signal based on a first component of the received signal.

12. The method of claim 11, wherein said computing the estimate of the first component of the transmitted signal includes performing a quantization operation on the first component of the received signal.

13. The method of claim 10, further comprising performing a Hilbert transform on the estimated first component of the transmitted signal to obtain the analytic representation thereof.

14. The method of claim 13, wherein said performing the Hilbert transform includes computing an approximate Hilbert transform of the estimated first component of the transmitted signal using a digital filter.

15. The method of claim 10, further comprising performing a Fourier transform on the estimated first component of the transmitted signal to obtain the analytic representation thereof.

16. The method of claim 10, further comprising computing a delayed version of the received signal, and a delayed version of the estimate of the first component of the transmitted signal, wherein said computing the phase error is further based on the delayed version of the received signal, and the delayed version of the estimate of the first component of the transmitted signal.

17. The method of claim 10, wherein the received signal includes a modulated signal, wherein the modulated signal is modulated using a single-carrier modulation scheme.

18. The method of claim 17, wherein the single-carrier modulation scheme includes a vestigial sideband modulation scheme.

19. An apparatus comprising:
a phase detector configured to compute phase error of a received signal, wherein the phase error is proportional to an output of an operation defined by:

$$I'(Q'-\hat{Q})-Q'(I'-\hat{I}'),$$

wherein $I'$ represents a delayed version of an in-phase component of the received signal, $Q'$ represents a delayed version of a quadrature phase component of the received signal, $\hat{I}'$ represents a delayed version of an estimate of an in-phase component of a transmitted signal, and $\hat{Q}$ represents an analytic representation of the estimate of the in-phase component of the transmitted signal; and a transform module configured to compute the analytic representation, $\hat{Q}$ based on at least one of a Hilbert transform or a Fourier transform performed on the estimate of the in-phase component of the transmitted signal.

20. The apparatus of claim 19, further comprising an estimate module configured to compute the estimate of the in-phase component of the transmitted signal by quantizing the in-phase component of the received signal, wherein the received signal includes a modulated signal, which is modulated using a vestigial sideband modulation scheme.

* * * * *